United States Patent
Criley et al.

[15] 3,642,235
[45] Feb. 15, 1972

[54] EXTRACTION FORCE TRANSFER SYSTEM

[72] Inventors: Ronald L. Criley, Conifer; Richard H. Frost, Littleton, both of Colo.; Predrag Shopalovich, Ashland, Mass.

[73] Assignee: The United States of America as represented by the Secretary of the Army

[22] Filed: Nov. 23, 1970

[21] Appl. No.: 91,899

[52] U.S. Cl. .................................................244/137 R
[51] Int. Cl. ..................................................B64d 1/12
[58] Field of Search ..........................................244/137

[56]  References Cited

UNITED STATES PATENTS 3,398,917   8/1968   Grabe ...................................244/137
3,424,410   1/1969   Galaup .................................244/137

Primary Examiner—Milton Buchler
Assistant Examiner—Steven W. Weinrieb
Attorney—Harry M. Saragovitz, Edward J. Kelly, Herbert Berl and Charles C. Rainey

[57]   ABSTRACT

An extraction force transfer system in an airdrop system for transferring the extraction force being applied to a load by the extraction parachute from the load to the deployment line of the recovery parachutes at a predetermined time after extraction of the load from an aircraft.

10 Claims, 6 Drawing Figures

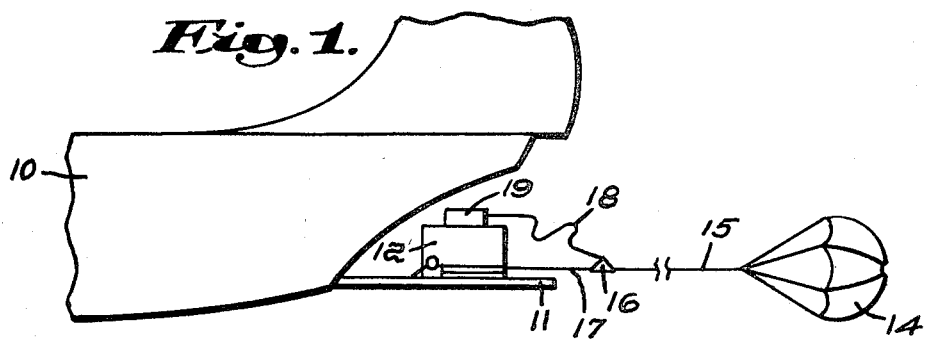
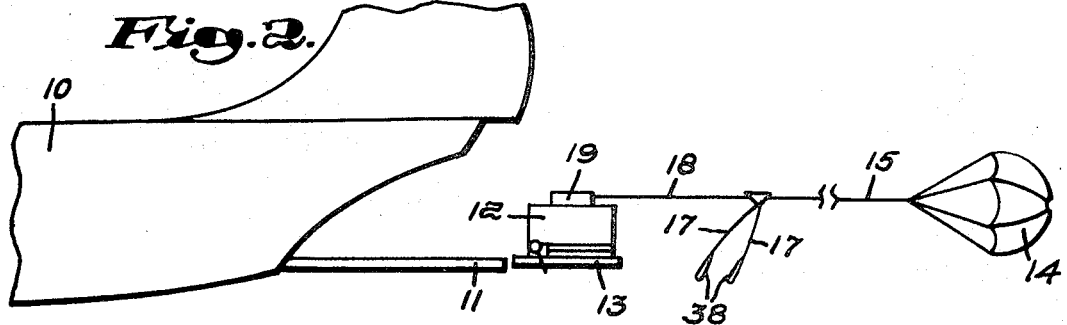
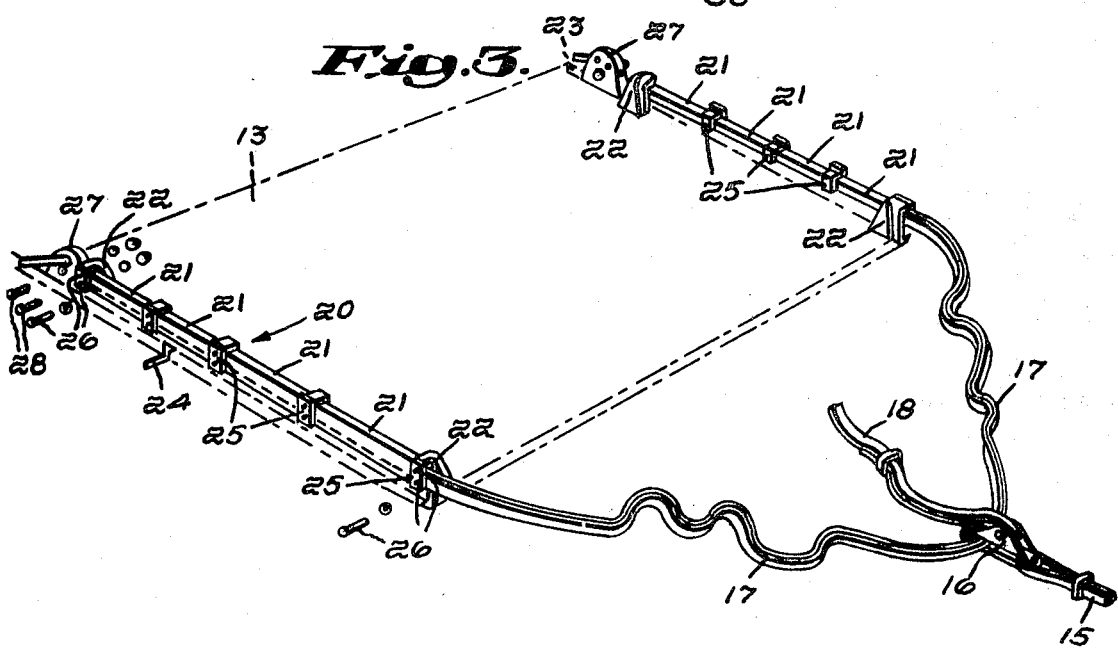

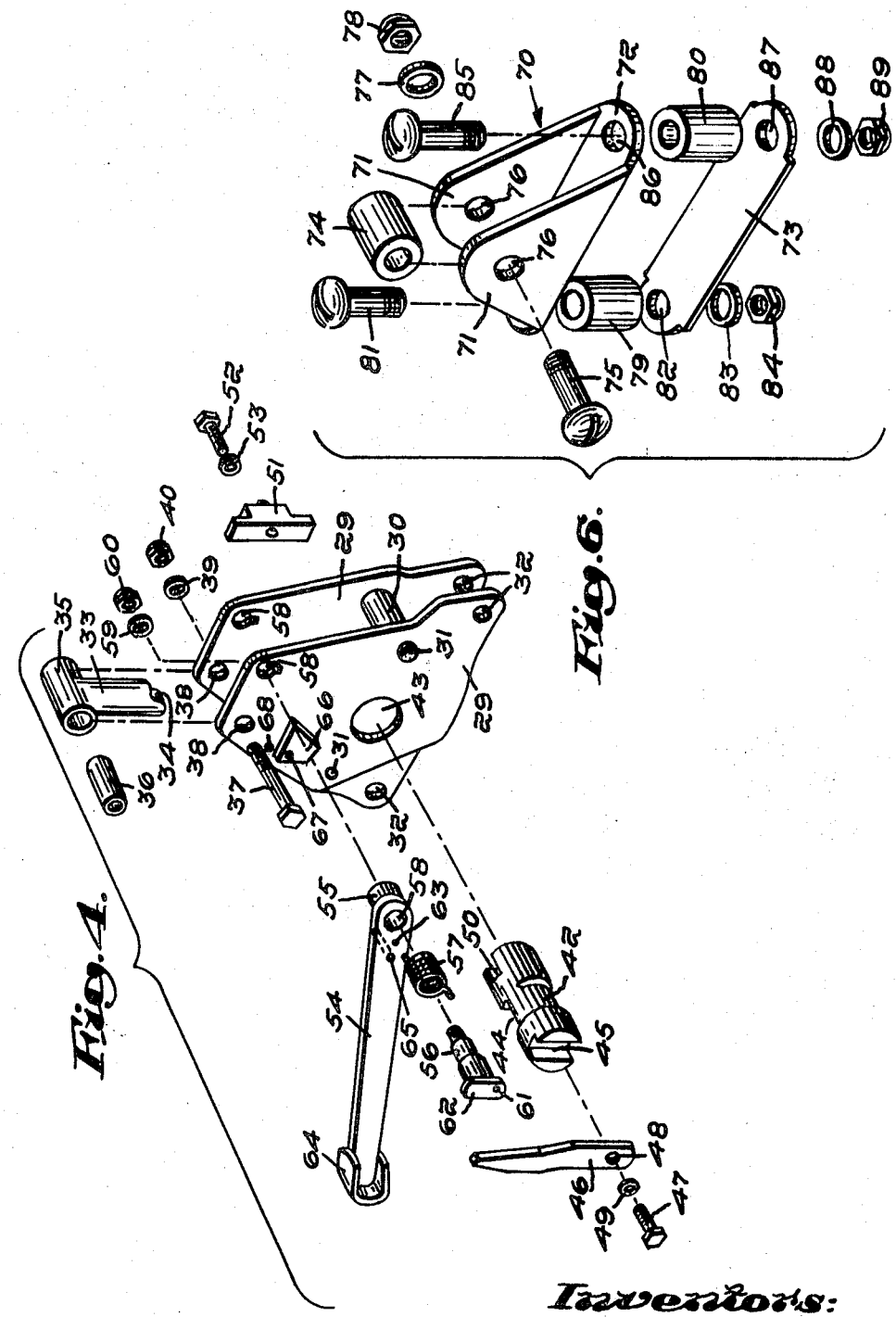

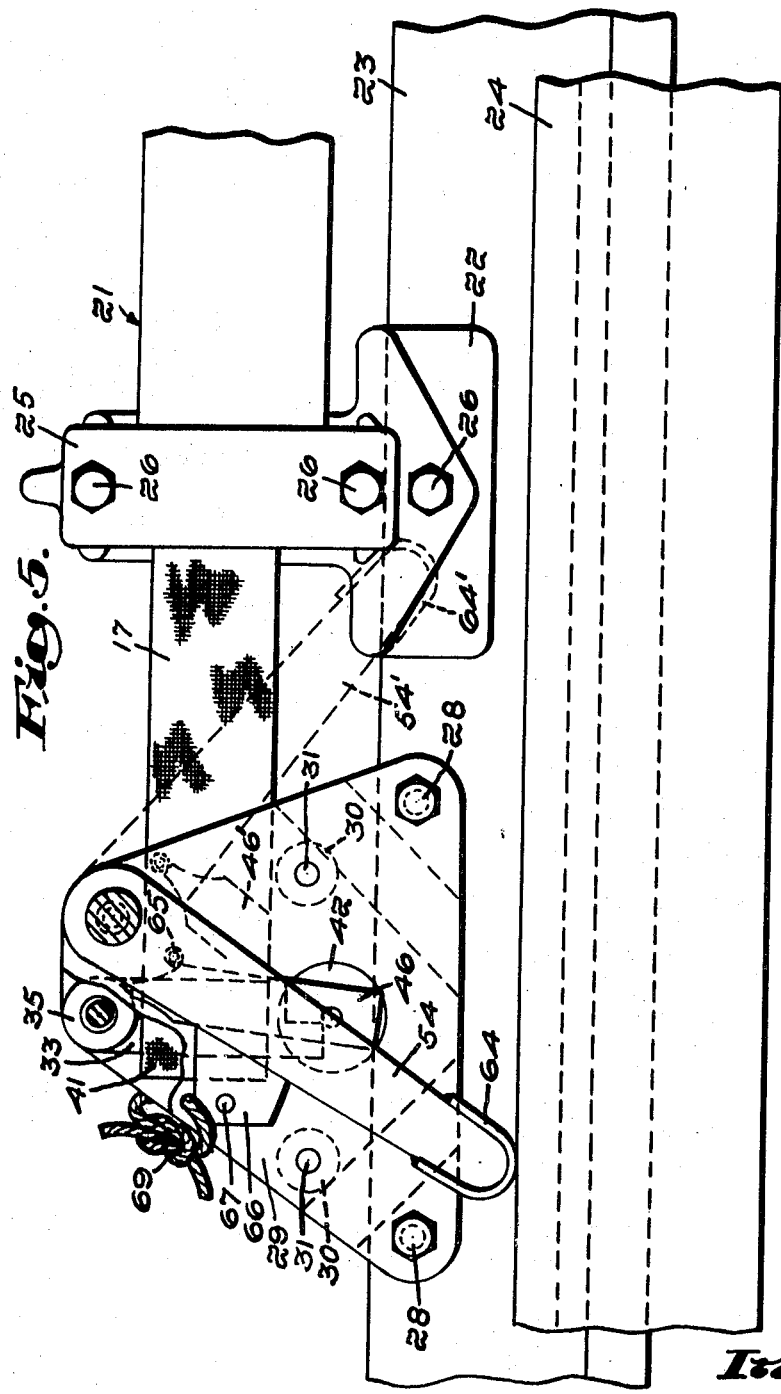

EXTRACTION FORCE TRANSFER SYSTEM

The invention described herein may be manufactured, used, an licensed by or for the Government for governmental purposes without the payment to us of any royalty thereon.

This invention relates to an airdrop system in which a load mounted on a platform is extracted from an aircraft in flight by an extraction parachute and is supported by recovery parachutes during its descent to earth. The movement of the platform within the aircraft occurs along and is guided by opposed parallel aircraft rails which engage platform rails disposed along the side edges of the platform. More particularly, the invention relates to an improved system for transferring the extraction force applied to the platform by the extraction parachute from the platform to the deployment line leading to the recovery parachute bags.

In the airdropping of a load from an aircraft the load must first be extracted from the aircraft. This is usually done by means of an extraction parachute which at the proper time is expelled from the aircraft in flight and becomes inflated, applying a large force to the load to which it is attached by a line, thus pulling the load out of the aircraft to the rear thereof. When the load is sufficiently clear of the aircraft to avoid entanglement of its recovery parachutes with the aircraft when the recovery parachutes become deployed, it is necessary to provide for a force to be applied to the bags in which the recovery parachutes are stowed on top of the load to remove the recovery parachute bags and permit the recovery parachutes to be inflated so as to lower the load safely to the ground. This has customarily been accomplished by transferring the force being exerted by the extraction parachute on the load to the recovery parachute bags at a predetermined time after extraction of the load from the aircraft.

It is an object of the invention to provide an improved system for transferring the extraction force being applied to a load being airdropped by the extraction parachute from the load to the deployment line for the recovery parachutes.

Other objects and advantages will be apparent from the following description of the invention, and the novel features will be particularly pointed out hereinafter in connection with the appended claims. In the accompanying drawings:

FIG. 1 is a schematic side view of the rear portion of an aircraft with its cargo ramp in position to discharge its load, the load resting on a platform which rides on the aircraft rails, and of the system, including the inflated extraction parachute, for extracting the load from the aircraft and thereafter transferring the extraction force from the load to the deployment line for the recovery parachutes. FIG. 1 shows the system just prior to the transfer of the extraction force.

FIG. 2 is a schematic side view of the rear portion of the aircraft, load, and extraction force transfer system of FIG. 1 when the load has cleared the aircraft. At this particular moment, the extraction force is beginning to be applied to the recovery parachute bags to remove them from the recovery parachutes and thus permit deployment of the recovery parachutes.

FIG. 3 is a perspective view of a platform which supports the load, the fair-lead tubes, brackets, and release assemblies, and the harness and clevis assembly, the harness line which leads from the extraction parachute to the clevis assembly and the harness line which leads to the recovery parachute bags being broken away for convenience.

FIG. 4 is an exploded view, in perspective, of the release assembly.

FIG. 5 is a side elevation of the release assembly and portions of the aircraft rail and the platform rail on one side edge of the platform, including a portion of a fair-lead tube, a portion of the bridle, a bracket and a doubler, portions of the release assembly after release thereof upon movement of the release assembly off the end of the aircraft rail during an airdrop being shown in phantom.

FIG. 6 is an exploded view, in perspective, of the clevis assembly.

In the illustrated embodiment of the invention, a cargo aircraft 10 is shown in part with its cargo ramp 11 in the lowered position for discharge of a load 12, which rests on a platform 13, under the force exerted thereon by extraction parachute 14.

In FIG. 1 the force exerted by extraction parachute 14 is transmitted through extraction parachute line 15, shown broken away for convenience, to clevis assembly 16, thence to platform 13 by means of bridle 17. Recovery parachute deployment line 18 connects clevis assembly 16 to recovery parachute bags 19 within which the recovery parachutes (not shown) are stowed on top of load 12 and which are readily removable from the recovery parachutes when the force exerted by the extraction parachute has been transferred at a preselected time from the platform to the recovery parachute bags, as shown in FIG. 2. When the recovery parachute bags have been removed from around the recovery parachutes, the latter become inflated and the load is safely lowered to the ground. The extraction parachute line 15, the recovery parachute deployment line 18, the bridle 17, the recovery parachute bags 19, and the clevis assembly 16 descend with the extraction parachute 14 and may be recovered for future use.

In FIG. 3 the platform 13 which supports the load (not shown in this figure) is provided with a pair of fair-lead tube assemblies 20, one such assembly being mounted along each side edge of the platform. Each fair-lead tube assembly preferably comprises several aluminum tubes 21 of substantially rectangular cross section and in telescoping sizes to facilitate the assembly of fair-lead tubes of varying lengths. Each tube assembly is clamped in place at the forward and aft ends by means of support brackets 22 which are mounted on platform rails 23, one of which is attached along each side edge of the platform running from the forward end to the aft end thereof, the platform rails being substantially parallel to each other and being engaged nd guided by a pair of substantially parallel aircraft rails 24. The telescoping tubes 21 are supported by doubler clamps 25 at the joints thereof by means of bolts (not shown). A doubler clamp is attached to support bracket 22 by means of bolts 26 at each end of each tube assembly. A bolt 26 also serves to attach each support bracket to the platform rail. A release assembly 27 is attached by means of bolts 28 to each platform rail 23 slightly forward of the forward end of each tube assembly.

As shown in FIG. 4, the release assembly 27 comprises a pair of sideplates 29 which are mirror images of each other and are maintained spaced apart by spacers 30, each of which is fixed at each end thereof to one of the sideplates by means of a welded joint 31. Thus each pair of sideplates can be used interchangeably on either side of the platform by attaching the same to one or the other of the platform rails with bolts 28 passing through holes 32 in the sideplates. Each release assembly also comprises a retainer pin 33, which is generally T-shaped, the vertical arm of the T having an indentation 34 on its free end for a purpose to be described and the horizontal arm or crosspiece 35 being hollow and receiving a bushing 36 through which bolt 37 passes. Bolt 37 also passes through holes 38 in the pair of sideplates of a release assembly as well as lock washer 39 and nut 40 which holds bolt 37 in place. Bushing 36 provides a bearing surface upon which the retainer pin is able to rotate freely when it is not prevented from doing so by means to be described hereinafter. The retainer pin fits into a loop 41 in on end of bridle 17, as shown in FIG. 5, to maintain that end of the bridle in position in the corresponding fair-lead tube assembly until the retainer pin is permitted to rotate, as will be explained hereinafter.

Each release assembly also comprises a generally cylindrically shaped bellcrank cam 42 which is journaled in annular opening 43 in each of the two sideplates of each release assembly. The bellcrank cam has a portion of its generally cylindrical cross section removed from the portion thereof which lies between the pair of sideplates when the bellcrank cam is journaled therein, to form the cam portion 44 thereof, which serves to restrain retainer pin 33 when the flat surface of the cam portion is oriented substantially vertically, as shown in FIGS. 4 and 5, the indentation 34 at the free end of retainer pin 33 contacting the flat surface of cam portion 44. However, when the bellcrank cam is rotated approximately 90° clockwise from the position thereof shown in FIGS. 4 and 5, the free end of the retainer pin containing indentation 34 can pass by the cam portion 44 and thus allow loop 41 of the bridle to slip off of the retainer pin.

The bellcrank cam 42 is provided with a slot in one end thereof in which bellcrank cam lever arm 46 fit at its lower end and is held in place therein by bolt 47 which passes through hole 48 and lock washer 49. Cam lever arm 46 has a curvature about midway of the length thereof so that the free end is offset from the outside surface of the sideplate. The other end of the bellcrank cam has a slot 50 therein in which impact arm 51 fits and is held in place therein by bolt 52 and lock washer 53.

Each release assembly is also provided with a trigger arm 54 having a hub element 55 on one end thereof about which the trigger arm rotates on trigger arm axle 56 which passes through coil spring 57, hole 58 in the trigger arm, hub element 55, keyhole 58, lock washer 59, and nut 60. Trigger arm axle 56 has a key portion (not shown) formed in the bottom surface thereof adapted to fit in the keyway portion of keyhole 58 to prevent the turning of the trigger arm axle, which also has a hole 61 passing through the head 62 thereof, into which one end of coil spring 57 fits while the other end of coil spring 57 fits into hole 63 in trigger arm 54 to enable the coil spring to be wound by the rotation of the trigger arm during the cocking thereof while preparations are being made for an airdrop of a load. The opposite end of the trigger arm from the hub element has a cam element 64 mounted thereon to serve as a bearing surface which rides on the aircraft rail during discharge of the load from the aircraft. The trigger arm also has a pin 65 extending from the surface of the trigger arm on the side thereof toward the hub element 55 of the trigger arm which bears against cam lever arm 46 when the trigger arm is cocked, thus preventing the rotation of the cam lever arm and likewise of cam 42 as long as the trigger arm remains cocked, i.e., until the cam element 64 of the trigger arm slides off and out of contact with the aircraft rail.

Each sideplate 29 has a stop block 66 mounted thereon, usually by being welded thereto or cast as an integral part of the sideplate, to serve as a stop against excessive rotation of cam 42 by reason of the impacting of impact arm 5 against the bottom of the stop block when the trigger arm releases the cam lever arm, thus freeing the cam to rotate under the force applied thereto by the retainer pin under the influence of the bridle and the force acting thereon. The stop block also serves to take up the shock of the rebound of the impact arm, the cam, and the cam lever arm, this shock being absorbed largely by the impact arm as it strikes the side of the stop block upon rebound once the retainer pin has cleared the cam. The stop block 66 has a hole 67 in the face thereof into which a locking pin (not shown) may be inserted to prevent premature release of the trigger arm after cocking thereof and during the installation or loading of the platform into the aircraft.

Each sideplate also contains a hole 68 through which a cord 69 made of nylon or other impact resistant material is laced and tied to serve as an impact absorber and stop for the retainer pin after release thereof by the rotation of the cam. Under the large force imparted to the retainer pin by the pull of the bridle, the retainer pin might damage the cam during rebound thereof in the absence of cord 69 or other means for limiting rotation of the retainer pin.

All of the parts of the release assembly 27 which fit into the sideplates 29, as described above, with the exception of the coil spring 57 may be used interchangeably with a given pair of sideplates attached to either side of the platform 13. Thus the trigger arm 54, the trigger arm axle 56, the cam 42, the cam lever arm 46, the impact arm 51, and bolts 37, 47, and 52 may be swung around to be introduced first through the opposite sideplate from that shown in FIG. 4 and installed in the release assembly so as to operate on the opposite side of the platform in the same manner as the release assembly shown in FIG. 4 operates when installed on the left side of the platform. However, a different coil spring, would in the opposite direction must be made available for the release assembly installed on the right side since in cocking the trigger arm, it is necessary to rotate it clockwise when the release assembly is mounted on the left side of the platform and counterclockwise when the release assembly is mounted on the right side of the platform. When the trigger arms are being cocked, they are rotated less than 360° from their uncocked or released positions, as described above, and then locked in these positions by inserting locking pins (not shown) in holes 67 to facilitate installation of the loaded platform in the aircraft. When the platform is in position in the aircraft, the locking pins may be removed to allow the cam element 64 of each trigger arm to rest on one of the aircraft rails on which it rides during extraction of the loaded platform from the rear of the aircraft.

The clevis assembly 16, which is shown in exploded view in FIG. 6, comprises a channel link 70 having two generally triangularly shaped sideplates 71 joined by a platelike base 72, and a plate link 73. A cylindrically shaped spacer 74 is mounted between the two sideplates 71 by means of bolt 75 which passes through holes 76 in the sideplates 71 and lockwasher 77 and is held in place by nut 78. Recovery parachute deployment line 18 is looped about spacer 74, as shown in FIGS. 1, 2, and 3. Plate link 73 is spaced from platelike base 72 of channel link 70 by means of two substantially parallel spaced-apart cylindrically shaped spacers 79 and 80 lying in the same plane, this plane being substantially perpendicular to the plane in which spacer 74 lies. Spacer 79 is held in pace by means of bolt 81, which passes through a hole, not shown, in one end of platelike base 72, through spacer 79, hole 82 in one end of plate link 73, lockwasher 83 and nut 84. Spacer 80 is likewise held in place by means of bolt 85, which passes through hole 86 in the other end of platelike base 72, through spacer 80, hole 87 in the other end of plate link 73, lockwasher 88 and nut 89.

As shown in FIG. 3, the bridle 17, which is an endless loop of webbing (or may comprise two or even more endless, concentric loops of webbing if the aluminum tubes 21 are made sufficiently large to accommodate several thicknesses of the webbing), usually made of nylon, passes through the clevis assembly between platelike base 72 and plate link 73 and bears against spacer 79, one end of the bridle being threaded through the tube assembly on the left side of platform 13 and the other end of the bridle being threaded through the tube assembly on the right side of platform 13. Each end of the bridle forms a loop 41 into which one of the retainer pins 33 fits, as described above and shown in FIG. 5, the retainer pins preventing the bridle from being withdrawn from the tube assemblies until the retainer pins are released by rotation of trigger arms 54, freeing cams 42 so that they may rotate under the influence of retainer pins 33 as a result of the force being applied thereto by the bridle passing through the clevis assembly. This force is applied to the clevis assembly by extraction parachute line 15, which is looped about spacer 80, as shown in FIGS. 1, 2, and 3.

In operating or using the extraction force transfer system of the invention, the extraction parachute line 15, which is connected to the extraction parachute 14, is connected to the clevis assembly 16 by being looped about spacer 80 while the recovery parachute deployment line 18 is connected to the clevis assembly by being looped about spacer 74. The bridle 17 formed of an endless webbing, or possibly two or more endless webbings which are assembled concentrically, is flattened to produce a double, quadruple, or other number of thicknesses in each of the two branches of the bridle, as shown in FIG. 3 and passed through the clevis assembly so that it bears against spacer 79. One branch of the bridle is threaded through the fair-lead tube assembly 20 mounted along the left side edge of the platform 13 while the other branch is threaded through the fair-lead tube assembly mounted along the right side edge of the platform. The end loops of the bridle are looped about the retainer pins 33 on the release assemblies 27, the cams 42 rotated to lock the retainer pins, the trigger arms 54 rotated forward to wind the coil springs 57 and lock the cam lever arms 46 in place so that the cams will not be able to rotate and release the bridle until the trigger arms have been permitted to rotate aft, as previously described. To prevent premature rotation of the trigger arms to unlock the cam lever arms, the locking pins are inserted in the holes 67 in the stop blocks to remain there until the platform has been loaded and the loaded platform has been placed in the aircraft with the trigger arms in position for the cam portions 64 thereof to rest on the aircraft rails 24 when the locking pins are removed. This is usually done shortly before the loaded platform is to be extracted from the aircraft in flight.

When all is ready, the aircraft takes off with the loaded platform. Then at the proper drop time and after removal of the locking pins, the cargo ramp 11 is lowered, the extraction parachute is expelled from the aircraft through the rear of the cargo compartment and the force transfer sequence goes into operation, the extraction force generated by the pull of the air on the extraction parachute drawing the loaded platform along the aircraft rails and the cargo ramp, then off the ramp, the trigger arms rotating aft, i.e., toward the extraction parachute to position 54', when the cam portions of the trigger arms ride free of the aircraft rails, thus freeing the cam lever arms 46 so that the force from the extraction parachute causes the retainer pins to force the rotation of the cams and cam lever arms to position 46', thereby allowing the retainer pins to rotate aft past the cams and release the loops of the bridle which had been held by the retainer pins up to that point. Both branches of the bridle are usually freed practically simultaneously when the release assemblies are properly located on the platform. When both branches of the bridle are freed at practically the same time, the bridle remains looped about spacer 79 of the clevis assembly and the force produced by the extraction parachute is transferred to the recovery parachute deployment line, thereby causing the recovery parachute bags 19 to be removed from around the recovery parachutes, which are packed on top of the load 12. The recovery parachutes then inflate and the load on the platform is safely lowered to earth while the clevis assembly and bridle are lowered to earth by the extraction parachute. In the event of malfunctioning of one of the release assemblies, the branch of the bridle released by the other release assembly is pulled through the clevis assembly and the bridle remains with the load during its descent.

The present invention is very useful in airdrop operations since it provides means for the efficient transfer of the extraction force applied by an extraction parachute from the load being extracted from an aircraft to the deployment line which deploys the recovery parachutes which lower the load safely to earth after an airdrop thereof. Most of the parts of the release assembly are interchangeable so that, with the exception of the spring which biases and drives the trigger arm, the parts may be used to assemble a release assembly for attachment to either side of the platform. Interchangeability of the parts of the release assembly, therefore, provides a distinct advantage with respect to logistics as well as in terms of cost. The clevis assembly has the advantage that, if for any reason one of the release assemblies does not release the bridle or if one branch of the bridle is caught or otherwise prevented from sliding through its fair-lead tube after having been released by the release assembly, the other branch of the bridle may pass through the clevis assembly and permit the transfer of the extraction force to occur without mishap.

It will be understood, of course, that various changes in the details, materials and arrangements of parts which have been herein described and illustrated in order to explain the nature of the invention, may be made by those skilled in the art within the principle and scope of the invention.

We claim:

1. In an airdrop system herein a load mounted on a platform is extracted from an aircraft in flight by an extraction parachute and thereafter descends by means of a recovery parachute and wherein movement of said platform within said aircraft is guided by opposed parallel aircraft rails which engage platform rails disposed on the sides of said platform, the improvement which comprises a system for transferring the extraction force applied to said platform by the extraction parachute to the deployment of the recovery parachute wherein an elongated flexible bridle member is connected at each end through fair-lead tubes mounted on each side of said platform to separate release means mounted on said platform rails on opposite sides of said platform a predetermined distance from the rear end of said platform, said bridle member being looped through a clevis and slidable therethrough, said clevis being connected to said extraction parachute and to the deployment bag of said recovery parachute, each of said release means having trigger means to activate same as said platform is extracted from the aircraft, whereby the ends of said bridle member are released and the extraction force is transferred through said clevis means to the deployment bag of the recovery parachute.

2. An improved airdrop system as in claim 1, wherein
said trigger means for said release means comprises spring loaded means adapted to bear on said aircraft rails and to activate said release means when said spring loaded means moves out of contact with said rails as said platform is extracted from the aircraft.

3. An improved airdrop system as in claim 1, wherein said fair-lead tubes comprise a plurality of telescoping sections adapted to be mounted on said platform rails.

4. An improved airdrop system as in claim 3, wherein said elongated flexible bridle member comprises an endless webbing.

5. An improved airdrop system as in claim 1, wherein said clevis comprises body means supporting three spaced attachment pins, two of said pins being parallel and lying in the same plane and the third pin lying in a plane perpendicular to the plane of the other two.

6. An improved airdrop system as in claim 1, wherein
each of said release means comprises a rotatable retainer pin, said bridle member being adapted to be looped about said retainer pin at one end thereof until said spring loaded means moves out of contact with said rail.

7. An improved airdrop system as in claim 6, wherein
each of said release means comprises a rotatable bellcrank means for restraining said retainer pin and thereby maintaining said bridle member looped about said retainer pin at one end thereof until said spring loaded means moves out of contact with said rail.

8. An improved airdrop system as in claim 7, wherein
each of said bellcrank means comprises a bellcrank cam and a bellcrank arm, said bellcrank cam being adapted to restrain said retainer pin and to maintain said bridle member looped about said retainer pin at one end of said bridle member until said spring loaded means moves out of contact with said rail.

9. An improved airdrop system as in claim 8, wherein
each of said release means comprises a pair of sideplates, said sideplates being mirror images and being adapted to support said spring loaded means, said rotatable retainer pin, and said rotatable bellcrank means.

10. An improved airdrop system as in claim 9, wherein
each of said release means comprises a flexible impact absorbing means spanning the separation between said pair of sideplates to absorb the energy imparted to said rotatable retainer pin when said spring loaded means moves out of contact with said rail and releases said bellcrank means.

\* \* \* \* \*